(12) United States Patent
Ahn et al.

(10) Patent No.: US 11,786,990 B2
(45) Date of Patent: Oct. 17, 2023

(54) LASER ETCHING APPARATUS AND LASER ETCHING METHOD USING THE SAME

(71) Applicant: Samsung Display Co., Ltd., Yongin-si (KR)

(72) Inventors: Jooseob Ahn, Yongin-si (KR); Taekil Oh, Yongin-si (KR); Gyoowan Han, Yongin-si (KR); Yeonghwan Ko, Yongin-si (KR); Yoongyeong Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 653 days.

(21) Appl. No.: 16/747,490

(22) Filed: Jan. 20, 2020

(65) Prior Publication Data

US 2020/0230740 A1 Jul. 23, 2020

(30) Foreign Application Priority Data

Jan. 21, 2019 (KR) .................. 10-2019-0007581

(51) Int. Cl.
| | |
|---|---|
| *B23K 26/06* | (2014.01) |
| *B23K 26/073* | (2006.01) |
| *B23K 26/382* | (2014.01) |
| *B23K 26/082* | (2014.01) |
| *B23K 26/362* | (2014.01) |
| *B23K 103/00* | (2006.01) |

(52) U.S. Cl.
CPC ...... *B23K 26/0604* (2013.01); *B23K 26/0648* (2013.01); *B23K 26/0732* (2013.01); *B23K 26/082* (2015.10); *B23K 26/362* (2013.01); *B23K 26/382* (2015.10); *B23K 2103/50* (2018.08)

(58) Field of Classification Search
CPC ............ B23K 2103/50; B23K 26/0604; B23K 26/0648; B23K 26/0732; B23K 26/082; B23K 26/362; B23K 26/364; B23K 26/382; B23K 26/388
USPC ..................................... 219/121.68
See application file for complete search history.

(56) References Cited

U.S. PATENT DOCUMENTS

| | | |
|---|---|---|
| 5,593,606 A | 1/1997 | Owen et al. |
| 6,861,008 B1 | 3/2005 | De Steur et al. |
| 7,939,435 B2 | 5/2011 | Kusumoto et al. |
| 10,171,636 B2 | 1/2019 | Yeo et al. |

(Continued)

FOREIGN PATENT DOCUMENTS

| | | |
|---|---|---|
| JP | 2001-025887 | 1/2001 |
| KR | 10-0258287 | 6/2000 |

(Continued)

OTHER PUBLICATIONS

Chappuis et al., Phase-Shift Master-Slave Mechanisms for High Angular-Speed Wedge-Prism Systems, International Journal of Optomechatronics, 2013, pp. 15-32.

*Primary Examiner* — Dana Ross
*Assistant Examiner* — Joseph W Iskra
(74) *Attorney, Agent, or Firm* — H.C. Park & Associates, PLC

(57) ABSTRACT

A laser etching apparatus includes a light source to emit a first laser beam having a first energy profile; and a scanner to radiate a second laser beam upon an object along a circular path, the second laser beam having a second energy profile different from the first energy profile.

20 Claims, 9 Drawing Sheets

(56) References Cited

U.S. PATENT DOCUMENTS

| | | |
|---|---|---|
| 2003/0086182 A1 | 5/2003 | Tanaka et al. |
| 2003/0168437 A1* | 9/2003 | Tanaka .............. H01L 21/02691 |
| | | 219/121.75 |
| 2006/0274418 A1 | 12/2006 | Hirai |
| 2009/0127477 A1* | 5/2009 | Tanaka ................ H01L 27/1285 |
| | | 362/331 |
| 2015/0243934 A1 | 8/2015 | Han et al. |
| 2016/0067824 A1* | 3/2016 | Dajnowski ........... B23K 26/361 |
| | | 219/121.64 |
| 2018/0026152 A1 | 1/2018 | Benson et al. |
| 2019/0105736 A1* | 4/2019 | Oh .......................... C22C 38/08 |

FOREIGN PATENT DOCUMENTS

| | | |
|---|---|---|
| KR | 10-2006-0127744 | 12/2006 |
| KR | 10-0752831 | 8/2007 |
| KR | 10-0929505 | 12/2009 |
| KR | 10-0950017 | 3/2010 |
| KR | 10-1094322 | 12/2011 |
| KR | 10-1298019 | 8/2013 |
| KR | 10-2015-0102180 | 9/2015 |
| KR | 10-2016-0000448 | 1/2016 |
| KR | 10-2017-0112790 | 10/2017 |

\* cited by examiner

LASER ETCHING APPARATUS AND LASER ETCHING METHOD USING THE SAME

CROSS-REFERENCE TO RELATED APPLICATION

This application claims priority from and the benefit of Korean Patent Application No. 10-2019-0007581, filed on Jan. 21, 2019, which is hereby incorporated by reference for all purposes as if fully set forth herein.

BACKGROUND

Field

Exemplary implementations of the invention generally relate to a laser etching apparatus and, more specifically, to a laser etching apparatus configured to form a hole by radiating a laser beam to a display panel, and a laser etching method using the laser etching apparatus.

Description of the Background

Generally, a hole is formed in a display panel such as an organic light-emitting display apparatus, wherein a camera module or a sensor is installed in the hole. The hole is generally formed in a non-display area of the display panel. However, as the size of the display has become narrow recently, there arises a need to form a hole in a display area.

The above information disclosed in this Background section is only for understanding of the background of the inventive concepts, and, therefore, it may contain information that does not constitute prior art.

SUMMARY

Applicant discovered that if a hole is formed in a display area by using a mechanical method like drilling, the cross-section of the drilled portion is uneven, which may disrupt viewing of the display. Moreover, oxygen and moisture may easily penetrate through the uneven cross-section, thereby degrading display quality. Alternatively, if the hole is drilled by using general laser, the size of the hole that may be drilled is limited due to the size of the laser beam spot. Thus, since a camera module or a sensor requires installation in a large hole, it may be difficult to use the general laser to drill a large hole in a multi-layered structure such as a display area of a display panel.

Laser etching apparatus constructed according to the principles and exemplary implementations of the invention and laser etching methods employing same are capable of stably drilling a larger hole than a spot of a laser beam. For example, using a laser etching apparatus constructed according to some exemplary implementations of the invention, a large and clean hole may be formed in a display of a display panel, so that product quality is stable. Accordingly, productivity may be enhanced, and stable product quality may be ensured.

Additional features of the inventive concepts will be set forth in the description which follows, and in part will be apparent from the description, or may be learned by practice of the inventive concepts.

According to one aspect of the invention, a laser etching apparatus to form a hole in a display panel having a multi-layered structure, the laser etching apparatus includes a light source to emit a first laser beam having a first energy profile; and a scanner to radiate a second laser beam upon an object along a circular path, the second laser beam having a second energy profile different from the first energy profile beam.

The laser etching apparatus may further include a diffraction optical device arranged between the light source and the scanner to convert the first laser beam to the second laser beam, the second laser beam having a linear beam profile.

The second laser beam may emanate from the diffraction optical device and may be rotatable in the circular path defined by the scanner.

The second laser beam may be rotatable along the circular path in a direction generally parallel with a radius of the circular trace.

The second laser beam may have a rectangular shaped cross section.

The second laser beam may have a trapezoidal shaped cross section.

The circular path may include an annular shape.

The scanner may include a light-transmitting lens, and a size of the laser beam may vary with a numeral aperture of the light-transmitting lens.

The scanner may include a pair of wedge lenses configured to rotate in a path of the laser beam and define the circular path.

The object may include a display area of the display panel.

According to another aspect of the invention, a laser etching method to form a hole in a display panel having a multi-layered structure, the method includes the steps of: preparing and drilling a hole in a display panel, wherein the drilling of a hole includes emitting a first laser beam from a light source; and radiating a second laser beam upon the display panel along a circular path, the second laser beam having a second energy profile different from that of the first laser beam.

The method may further include the step of, before radiating the first laser beam emitted from the light source to the display panel, converting the first laser beam to the second laser beam, the second laser beam having a linear beam profile defined by a diffraction optical device.

The second laser beam may be rotated in the circular path defined by the scanner.

The second laser beam may be rotated along the circular path in a direction substantially parallel with a radius of the circular path.

The second laser beam may have a rectangular shaped cross section.

The second laser beam may have a trapezoidal shaped cross section.

The circular path may include an annular path.

The scanner may include a light-transmitting lens, and the size of the laser beam may be adjusted by using a numeral aperture of the light-transmitting lens.

The scanner may include a pair of wedge lenses configured to rotate in a path of the laser beam, and the circular path may be defined by rotating the pair of wedge lenses.

The hole may be drilled in a display area of the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
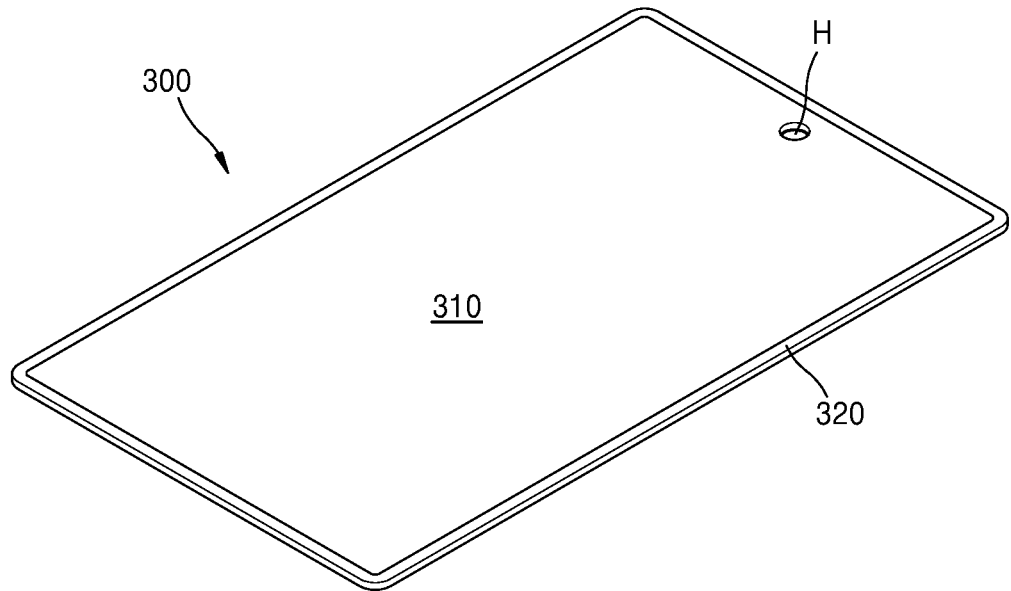
FIG. 1 is a perspective view of an exemplary embodiment of a display panel in which a hole is formed by a laser etching apparatus constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an exemplary embodiment of a display panel in which a hole is formed by a laser etching apparatus constructed according to the principles of the invention. FIG. 1 illustrates a display panel 300 in which a hole H is formed by a laser etching apparatus 100 (refer to FIG. 4) according to an exemplary embodiment.

As shown in FIG. 1, the display panel 300 includes a display area 310 in which an image is displayed, and a non-display area 320 in a periphery of the display area 310. The hole H arranged in the display area 310. That is, as the non-display area 320 has become narrowed in recent designs, the non-display area 320 does not include enough free space in which the hole H to be arranged for a camera module or a sensor to be installed in the hole H. Accordingly, the hole H is arranged in the display area 310.

A plurality of pixels are arranged in the display area 310. Each of the plurality of pixels has a structure shown in FIG. 2.

Figure 2:
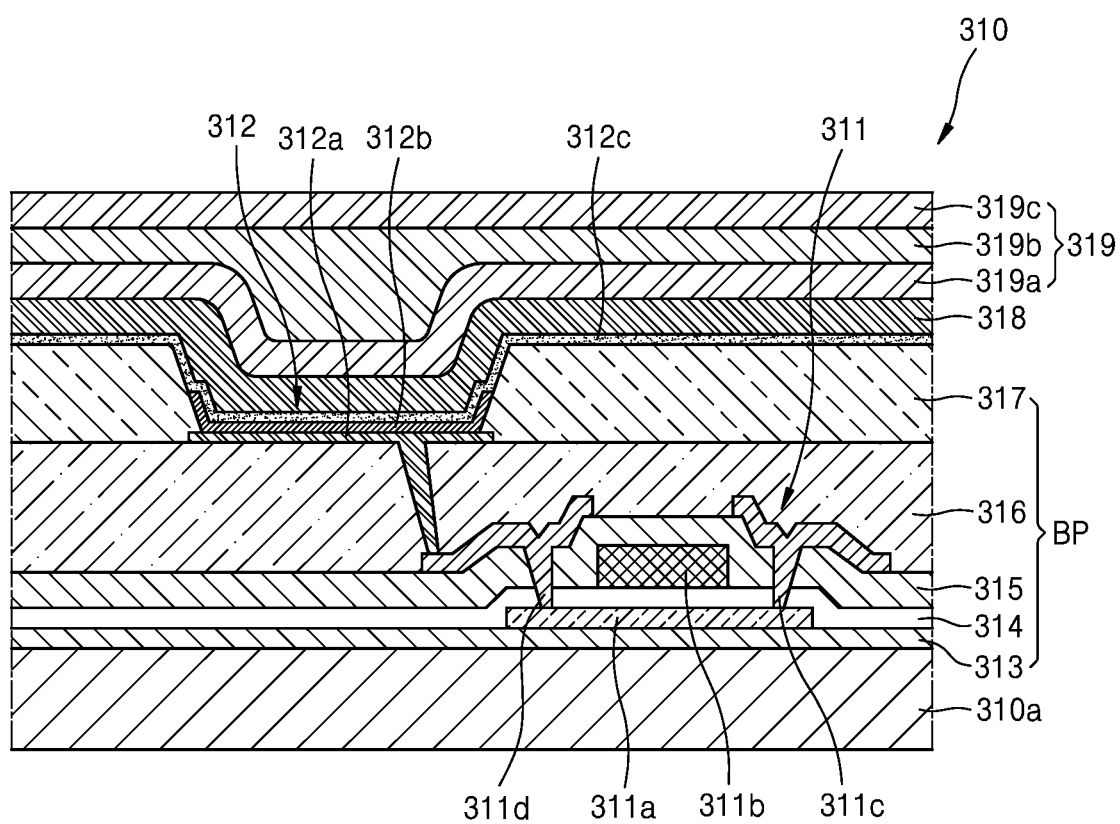
FIG. 2 is a cross-sectional view of a representative pixel structure in a display area of the display panel of FIG. 1.

FIG. 2 is a cross-sectional view of a representative pixel structure in a display area of the display panel of FIG. 1. Referring to FIG. 2, a buffer layer 313 is arranged on a substrate 310a. Over the buffer layer 313, a thin-film transistor 311 and an organic light-emitting device 312 are arranged.

The thin-film transistor 311 includes an active layer 311a, a gate insulating layer 314 arranged to cover the active layer 311a, and a gate electrode 311b on the gate insulating layer 314.

An interlayer insulating layer 315 is arranged to cover the gate electrode 311b. A source electrode 311c and a drain electrode 311d are arranged on the interlayer insulating layer 315.

The source electrode 311c and the drain electrode 311d are in contact with a source area and a drain area of the active layer 311a, respectively, via contact holes in the gate insulating layer 314 and the interlayer insulating layer 315.

The drain electrode 311d is connected to a pixel electrode 312a of the organic light-emitting device 312. The pixel electrode 312a is arranged on the planarization layer 316. A pixel-defining layer 317 is arranged on the pixel electrode 312a, wherein the pixel-defining layer 317 defines a sub-pixel area. Layers in a range from the buffer layer 313 to the pixel electrode 312a and the pixel-defining layer 317 is generally referred to as a backplane layer BP.

Additionally, a light-emitting layer 312b of the organic light-emitting device 312 arranged in an opening of the pixel-defining layer 317. An opposite electrode 312c is vapor-deposited on the pixel-defining layer 317 and the light-emitting layer 312b. That is, the opening defined by the pixel-defining layer 317 is a light-emitting area of a pixel, such as a red (R) pixel, a green (G) pixel, or a blue (B) pixel, and the light-emitting layer 312b corresponding to a color of the pixel is arranged in the light-emitting area of the pixel. Although FIG. 2 illustrates a structure of one pixel, it is understood that a plurality of such pixels are arranged in rows and columns in a display.

In addition, on the opposite electrode 312c, a capping layer 318, an inorganic layer 319a, an organic layer 319b, and an inorganic layer 319c are sequentially stacked, wherein the capping layer 318 is a protective layer, and the inorganic layer 319a, the organic layer 319b, and the inorganic layer 319c constitutes a thin-film encapsulation layer 319 configured to prevent penetration of moisture and oxygen from outside.

Accordingly, a large hole H in the display area 310 needs to be stably drilled in a multi-layered structure including layers.

Figure 3A:
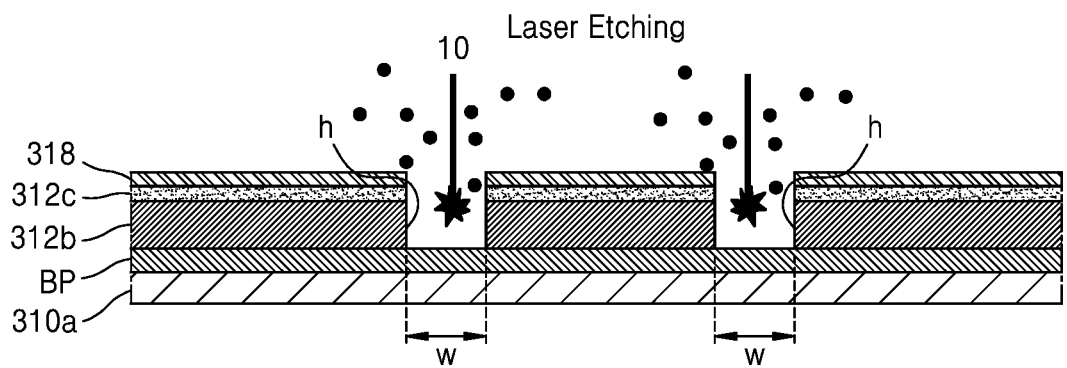
FIGS. 3A, 3B, and 3C are cross-sectional views illustrating an exemplary embodiment of a process of forming a hole in the display area by using a laser etching apparatus constructed according to the principles of the invention.
Figure 3B:
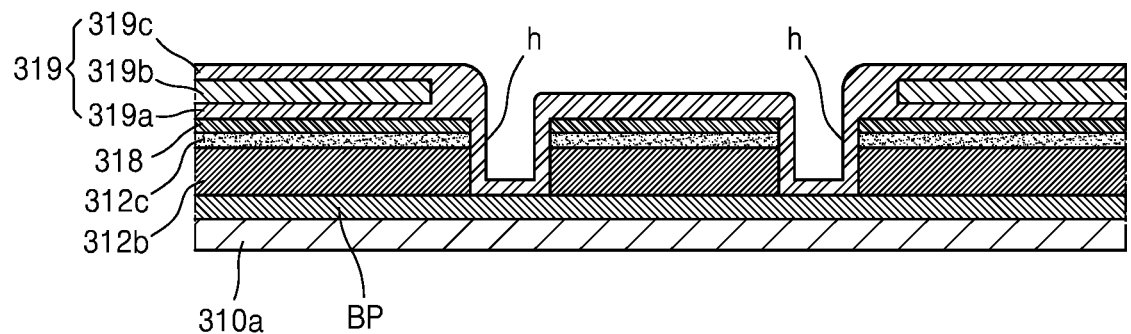
Figure 3C:
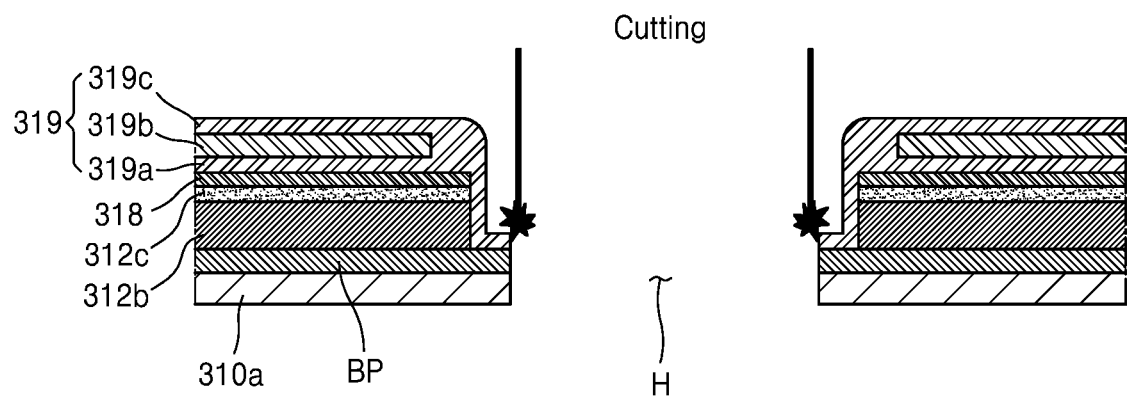

FIGS. 3A to 3C are cross-sectional views illustrating an exemplary embodiment of a process of forming a hole in the display area by using a laser etching apparatus constructed according to the principles of the invention. FIGS. 3A to 3C schematically illustrate a method of forming the hole H in the multi-layered structure by using the laser etching apparatus 100 (refer to FIG. 4) according to an exemplary embodiment.

Here, for convenience of description, the layers in a range from the buffer layer 313 to the pixel electrode 312a and the pixel-defining layer 317 are schematically illustrated as the backplane layer BP. In addition, the light-emitting layer 312b may be a light-emitting layer in a pixel. However, it may be understood that the light-emitting layer 312b may include a layer formed of the same material as that of the light-emitting layer 312b and arranged on the same layer in the display area 310 as the layer on which the light-emitting layer 312b is arranged.

As shown in FIG. 3A, a groove h having an annular (ring or donut) shape (see FIGS. 6 and 7) is formed by radiating a laser beam 10 upon a multi-layered structure, wherein the substrate 310a includes a polyimide material and the multi-layered structure includes layers in a range from the backplane layer BP to the capping layer 318 over the substrate 310a. In other words, the groove h may be formed in a circular area and the area irradiated with the laser beam may be annular in shape having a predetermined width w. The groove h is formed by drilling down into the capping layer 318, the opposite electrode 312c, and the light-emitting layer 312b. The groove h may be drilled down further than the light-emitting layer 312b. However, layers down to the light-emitting layer 312b are configured to actually render an image and may be viewed directly by a viewer. In addition, the light-emitting layer 312b most sensitive to moisture and oxygen, and even cutting layers below the light-emitting layer 312b by using a mechanical may not be a problem. Accordingly, an appropriate strength of the laser beam 10 may be selected to form the groove h downward only in the three layers such as the capping layer 318, the opposite electrode 312c, and the light-emitting layer 312b. In addition, the groove h is drilled not to have a size of a spot of the laser beam 10, but is formed in a certain area to have an annular shape (refer to FIGS. 6 and 7) having a width w by radiating the laser beam 10 along a circular trace (refer to FIG. 6). As a result, the hole H may be formed to have a large size as discussed below.

The laser beam 10 used to drill the groove h is not radiated in the form of a Gaussian-profile laser beam, but in the form of a laser beam having a linear beam profile in which a strength of the laser beam is planarized. Accordingly, the groove h has an evenly-drilled form overall, instead of a form in which only a portion of the groove h corresponding to a center of the laser beam 10 is drilled deep, and a portion of the groove h corresponding to an edge of the laser beam 10 is drilled little. The linear beam is formed by a diffraction optical device 130 (refer to FIG. 4). This will be described later.

After the groove h is formed, the inorganic layer 319a, the organic layer 319b, and the inorganic layer 319c of the thin-film encapsulation layer 319 are sequentially formed as shown in FIG. 3. By doing so, a side surface of the light-emitting layer 312b, exposed when the groove h is formed, is covered to be thereby protected from penetration of moisture and oxygen.

Next, as shown in FIG. 3C, the hole H having a large size is formed by cutting the backplane layer BP and the substrate 310a, each arranged below the groove h, in the middle area of the width of the groove h. The backplane layer BP and the substrate 310a may each be cut by using mechanical cutting, or by radiating a general Gaussian-profile spot laser beam along an edge of the groove h. Then, a camera module, a sensor, or the like is arranged in the hole H.

Figure 4:
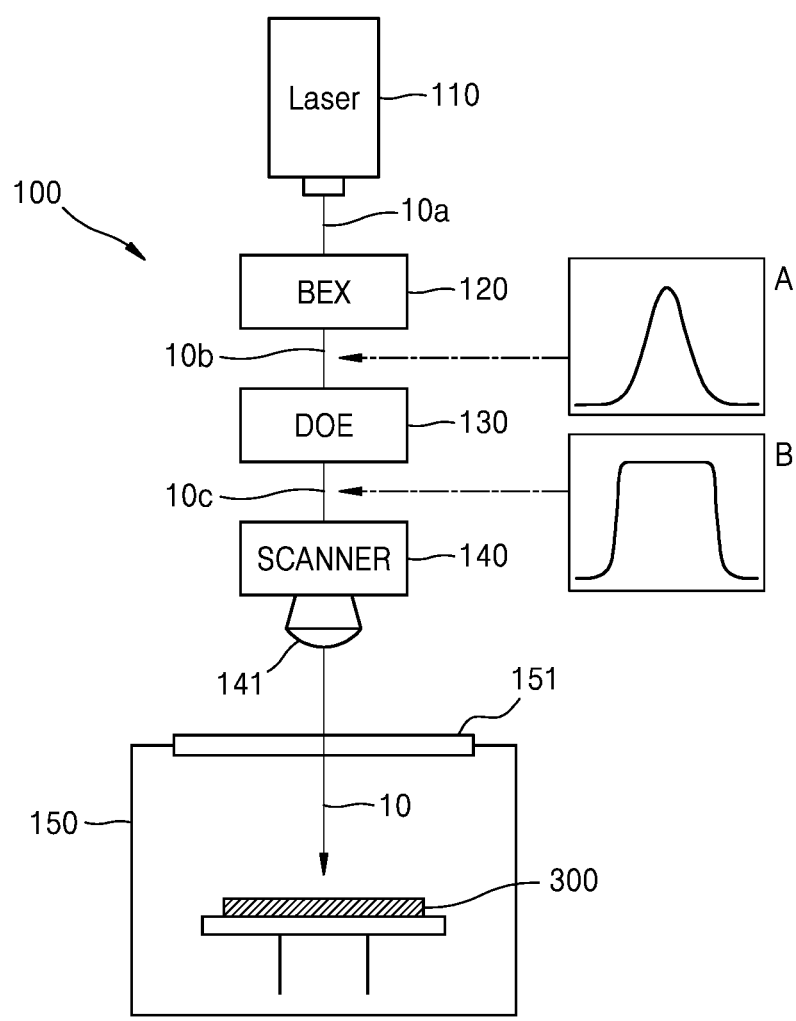
FIG. 4 is a block diagram of an exemplary embodiment of a laser etching apparatus constructed according to the principles of the invention.
Figure 5A:
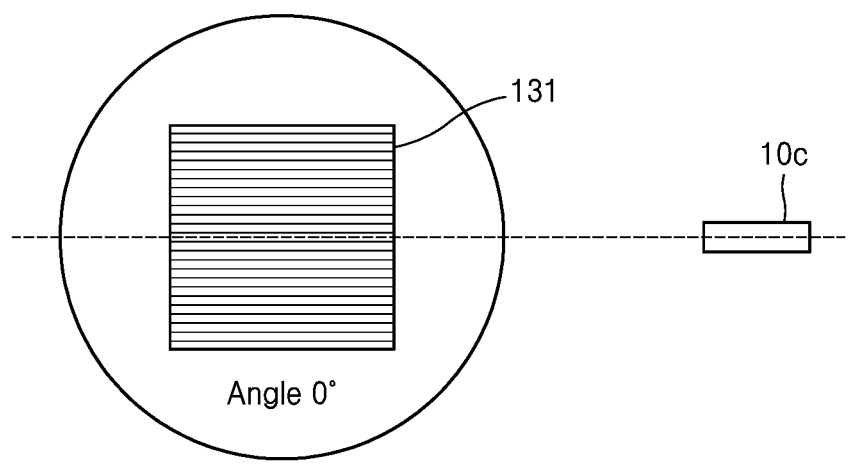
FIGS. 5A, 5B, and 5C are schematic diagrams illustrating an exemplary embodiment of a process of rotating a linear beam, the rotating being performed by a diffraction optical device in the laser etching apparatus of FIG. 4.
Figure 5B:
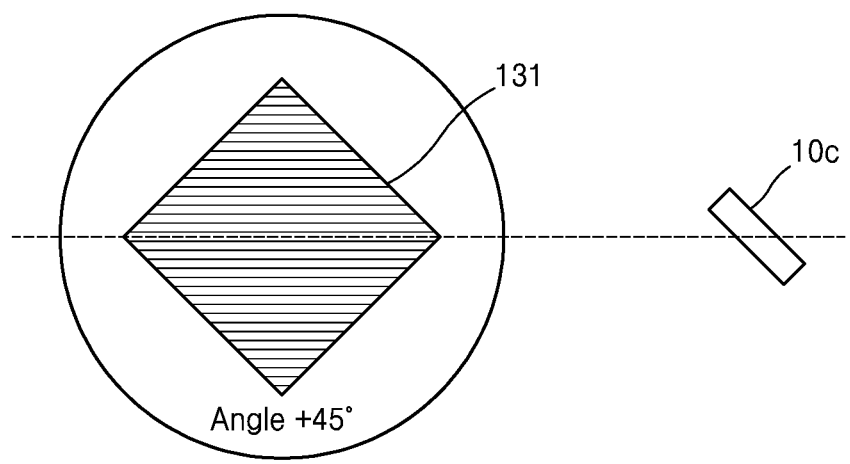
Figure 5C:
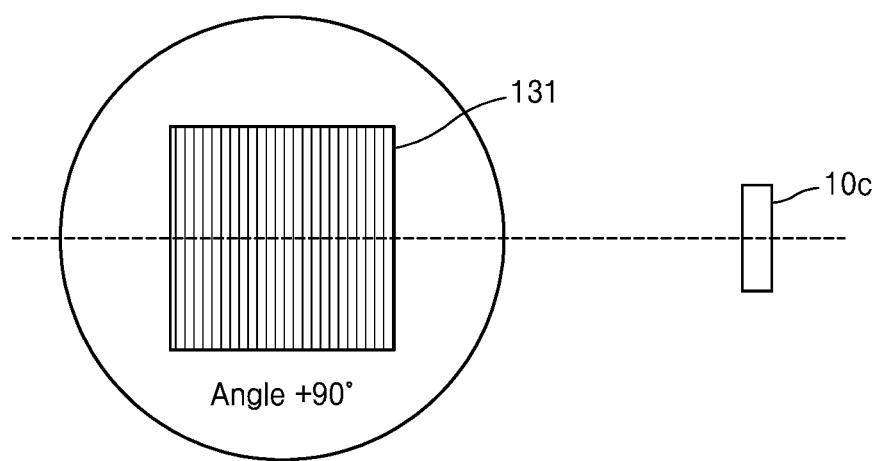

FIG. 4 is a block diagram of an exemplary embodiment of a laser etching apparatus constructed according to the principles of the invention. FIGS. 5A to 5C are schematic diagrams illustrating an exemplary embodiment of a process of rotating a linear beam, the rotating being performed by a diffraction optical device in the laser etching apparatus of FIG. 4. Now, referring to FIG. 4, the laser etching apparatus 100 in the illustrated exemplary embodiment is described, wherein the laser etching apparatus 100 is configured to form the groove h and the hole H.

The laser etching apparatus 100 constructed according to the principles of the invention includes a light source 110 configured to emit the laser beam 10a, a beam expander BEX 120 configured to expand the laser beam 10a, the diffraction optical device DOE 130 configured to convert the laser beam 10b having a Gaussian-profile A to a laser beam 10c having a linear beam profile B, and the scanner 140 configured to radiate the laser beam 10c having the linear beam profile B to an object, for example, the display panel 300, along a circular trace. A reference numeral 150 denotes a vacuum chamber in which the object to be fabricated, for example, the display panel 300 is mounted, a reference numeral 151 denotes a light-transmitting window, and a reference numeral 300 may be used both for an object and a display panel.

Here, as briefly described with reference to in FIG. 4, the diffraction optical device 130 converts the laser beam 10b having a Gaussian profile A in which a strength of the beam is concentrated at the center of the beam to the laser beam 10c having a linear beam profile B in which a strength of a beam is even and planarized overall.

To do so, the diffraction optical device 130 includes a diffraction pattern 131 as shown in FIGS. 5A to 5C. That is, as the laser beam 10b having the Gaussian profile A passes through the diffraction pattern 131, the laser beam 10b is converted to the laser beam 10c having a linear beam profile B. In addition, the diffraction pattern 131 rotates as shown in FIGS. 5A to 5C. The rotation of the diffraction pattern 131 is to change an angle of the linear beam in interoperation with a circular trace derived by the scanner 140. For example, the direction of the laser beam 10c having a linear beam profile B may be the same as the direction of arrangement of the diffraction pattern 131.

Figure 6:
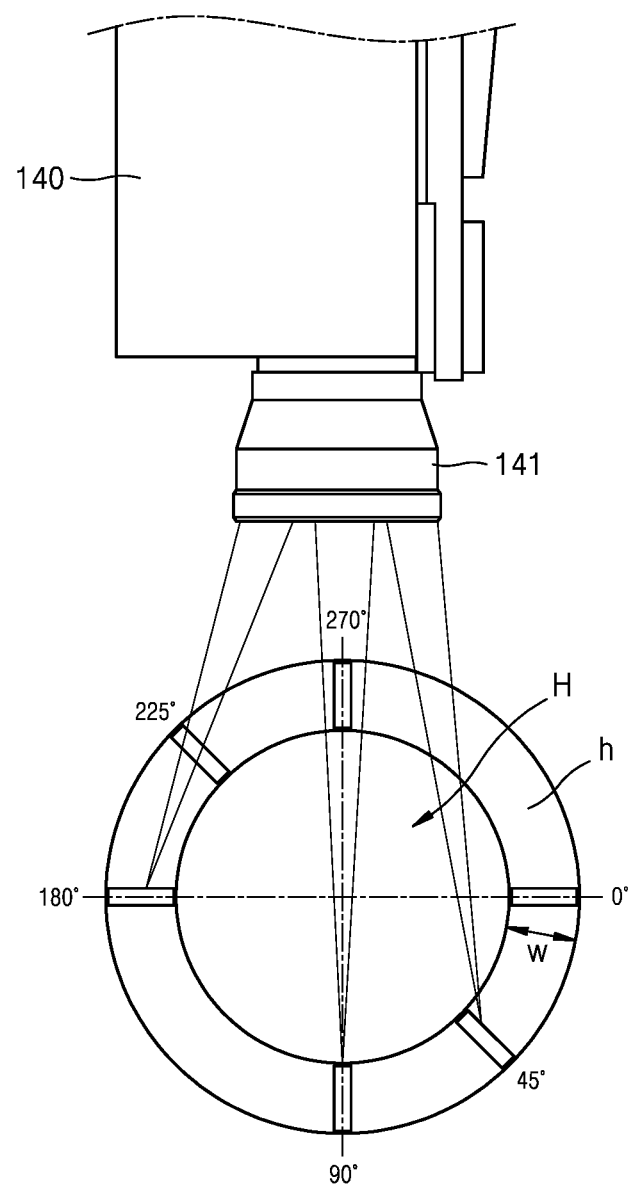
FIG. 6 is a schematic diagram illustrating an exemplary embodiment of a process of deriving a circular track to be cut by a scanner in the laser etching apparatus of FIG. 4.

FIG. 6 is a schematic diagram illustrating an exemplary embodiment of a process of deriving a circular track to be cut by a scanner in the laser etching apparatus of FIG. 4. FIG. 6 illustrates interoperation of the scanner 140 with the diffraction optical device 130. The scanner 140 radiates the laser beam 10c having a linear beam profile B along a circular trace to thereby form the groove h having an annular shape described above for the object 300. Since not a laser beam having a spot size (e.g., a laser beam 10b having a Gaussian profile A), but the laser beam 10c in a linear beam profile B that is planarized is emitted, the groove h having an annular shape instead of a simple circle is generated, thereby the area irradiated with the laser beam 10c in the groove h may have a predetermined width w. In addition, the diffraction optical device 130 rotates the diffraction pattern 131 in interoperation with a motion of the scanner 140 to thereby control the laser beam 10 having a linear beam profile to be in parallel with a direction of a radius of the circular trace. By doing so, the groove h may be formed to have a uniform width w along the circular trace.

A size of the laser beam 10c in a linear beam profile B, radiated to the object 300, may be adjusted by using a numerical aperture in a light-transmitting lens 141 of the scanner 140. For example, the transmission lens having a high numerical aperture may be used to reduce a size of the laser beam 10, and the transmission lens having a low numerical aperture may be used to increase a size of the laser beam 10. When a size of the laser beam 10 is small, the groove h having a sufficient width may not be formed by using only a circular trace. Then, the scanner 140 may control the laser beam 10 to move the laser beam 10 in a direction of a radius along the circular trace from a point of radiation. Such a trace obtained in combination with the circular trace with a trace in the direction of a radius may be referred to as an annular trace. It may be understood that the annular trace may be a specific modified trace included in a circular trace.

A process of forming the hole H by using the laser etching apparatus 100 having such a configuration will be briefly described with reference to FIGS. 3A to 3B.

As shown in FIG. 3A, a multi-layered structure is prepared on the substrate 310a as the object 300, wherein the multi-layered structure includes layers in a range from the backplane layer BP to the capping layer 318 and installed in the vacuum chamber 150 shown in FIG. 4. Then, the groove h is formed by radiating the laser beam 10 having a linear beam profile along a circular trace by using the scanner 140, wherein the laser beam 10 having a linear beam profile is a result of converting the laser beam 10 by using the diffraction optical device 130.

Accordingly, the groove h is drilled down into the capping layer 318, the opposite electrode 312c, and the light-emitting layer 312b and formed to have an annular shape. As the result of the conversion of the laser beam 10, that is, the laser beam 10 is radiated having a linear beam profile and a uniform strength along a width w of the groove h, a wall portion of the groove h is fabricated as almost uniformly as a center of the groove h. Thus, a cross-section of the groove h may be formed not to be rough, but to be as clean as a vertical wall.

Next, as shown in FIG. 3B, the inorganic layer 319a, the organic layer 319b, and the inorganic layer 319c of the thin-film encapsulation layer 319 are sequentially formed to cover a side surface of the light-emitting layer 312b that was exposed when the groove h is formed.

Then, as shown in FIG. 3C, the hole H having a large size is formed by cutting the backplane layer BP and the substrate 310a below the groove h. A camera module or a sensor is installed in the hole H.

Accordingly, as such, by using the laser beam 10 having a linear beam profile, the groove h having an annular shape is formed, and then, drilled to form the hole H. Thus, the hole H having a greater size than that of a spot of the laser beam 10 may be stably drilled. Particularly, since a large hole may be formed also in a display area of the display panel 300, product quality may be stable.

Figure 7:
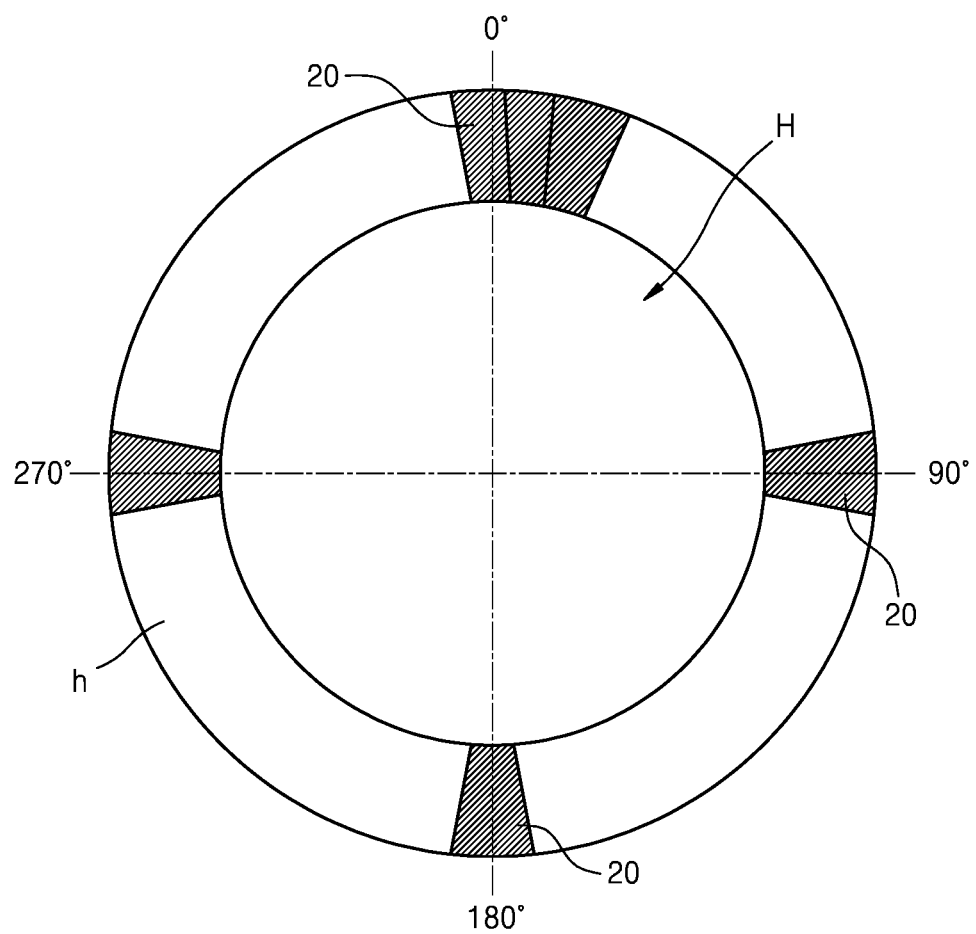
FIG. 7 is a schematic diagram illustrating an exemplary embodiment of a linear beam of FIG. 6.

FIG. 7 is a schematic diagram illustrating an exemplary embodiment of a linear beam of FIG. 6. According to the exemplary embodiment described above, an example of converting the laser beam 10 to the laser beam 10 having a rectangular linear beam profile by using the diffraction pattern 131 of the diffraction optical device 130 is described. However, as shown in FIG. 7, the laser beam 10 may be converted to a trapezoidal linear beam 20. That is, the diffraction pattern 131 may be variously modified to select a shape of an appropriate linear beam to thereby radiate the laser beam 10 compactly along a circumference in a circular track.

Figure 8:
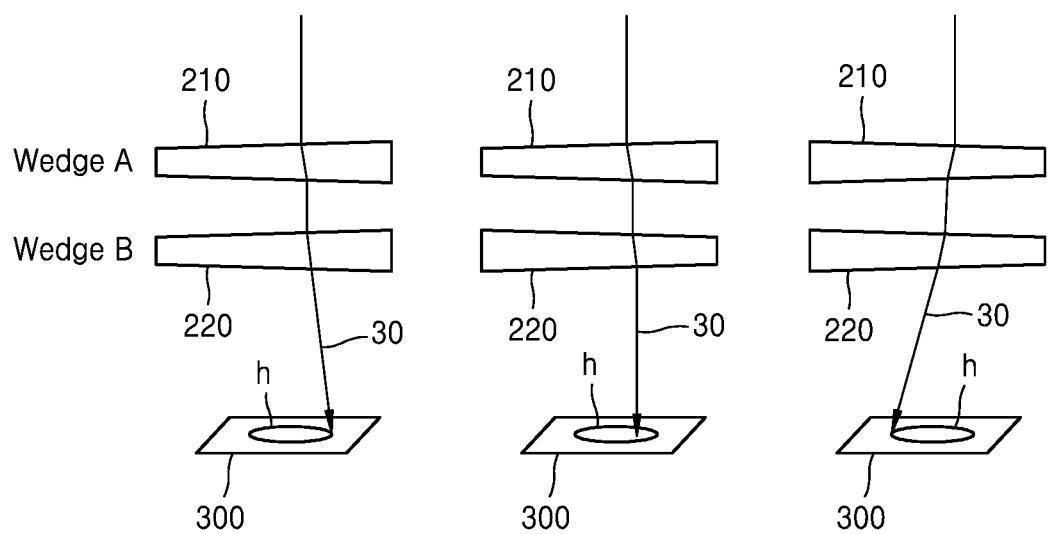
FIG. 8 is a schematic diagram illustrating an exemplary embodiment of the scanner of FIG. 6.

FIG. 8 is a schematic diagram illustrating an exemplary embodiment of the scanner of FIG. 6. In addition, with respect to the scanner 140 described above, a structure for adjusting a trace of light radiation by using a mirror installed inside the scanner 140 is described as an example. However, the mirror inside the scanner 140 may be converted to a pair of wedge mirrors 210 and 220, as shown in FIG. 8. That is, the scanner 140 may be configured such that the pair of wedge mirrors 210 and 220 are installed in a path of a laser beam 30 and rotated to derive a circular trace. Accordingly, the scanner 140 may be variously modified within the scope of the inventive concepts.

As described above, by using the laser etching apparatus and method, a hole larger than a spot of a laser beam may be stably drilled. Particularly, as a large and clean hole may be formed in a display of a display panel, product quality is stable. Accordingly, productivity may be enhanced, and stable product quality may be ensured.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A laser etching apparatus comprising:
   a light source to emit a first laser beam having a first energy profile;
   a beam expander to expand the first laser beam to have a Gaussian-profile;
   a diffraction optical device to convert the expanded first laser beam having the Gaussian-profile to a second laser beam having a linear beam profile; and
   a scanner to radiate the second laser beam upon an object along a circular path,
   wherein the Gaussian profile has a strength of the beam concentrated at a center of the expanded first laser beam, and the linear beam profile has a strength of a beam which is substantially even and planarized overall of the second laser beam.

2. The laser etching apparatus of claim 1, wherein the diffraction optical device is arranged between the light source and the scanner.

3. The laser etching apparatus of claim 2, wherein the second laser beam emanates from the diffraction optical device and is rotatable in the circular path defined by the scanner.

4. The laser etching apparatus of claim 3, wherein the second laser beam is rotatable along the circular path in a direction generally parallel with a radius of the circular trace.

5. The laser etching apparatus of claim 2, wherein the second laser beam has a rectangular shaped cross section.

6. The laser etching apparatus of claim 2, wherein the second laser beam has a trapezoidal shaped cross section.

7. The laser etching apparatus of claim 1, wherein the circular path comprises an annular shape.

8. The laser etching apparatus of claim 1, wherein the scanner comprises a light-transmitting lens, and
   a size of the laser beam varies with a numerical aperture of the light-transmitting lens.

9. The laser etching apparatus of claim 1, wherein the scanner comprises a pair of wedge lenses configured to rotate in a path of the laser beam and define the circular path.

10. The laser etching apparatus of claim 1, wherein the object comprises a display area of the display panel.

11. A laser etching method comprising the steps of:
    preparing and drilling a hole in a display panel,
    wherein the drilling of a hole comprises:
    emitting a first laser beam having a first enemy profile from a light source;
    expanding the first laser beam to have a Gaussian-profile;
    converting the expanded first laser beam having the Gaussian-profile to a second laser beam having a linear beam profile; and
    radiating the second laser beam upon the display panel along a circular path by a scanner,
    wherein the Gaussian profile has a strength of the beam concentrated at a center of the expanded first laser beam, and the linear beam profile has a strength of a beam which is substantially even and planarized overall of the second laser beam.

12. The method of claim 11, wherein the second laser beam, the second laser beam has the linear beam profile defined by a diffraction optical device.

13. The method of claim 12, wherein the second laser beam is rotated in the circular path defined by the scanner.

14. The method of claim 13, wherein the second laser beam is rotated along the circular path in a direction substantially parallel with a radius of the circular path.

15. The method of claim 12, wherein the second laser beam has a rectangular shape cross section.

16. The method of claim 12, wherein the second laser beam has a trapezoidal shape cross section.

17. The method of claim 11, wherein the circular path comprises an annular path.

18. The method of claim 11, wherein the scanner comprises a light-transmitting lens, and the size of the laser beam is adjusted by using a numerical aperture of the light-transmitting lens.

19. The method of claim 11, wherein the scanner comprises a pair of wedge lenses configured to rotate in a path of the laser beam, and the circular path is defined by rotating the pair of wedge lenses.

20. The method of claim 11, wherein the hole is drilled in a display area of the display panel.

\* \* \* \* \*